United States Patent
Rashty

(10) Patent No.: US 12,264,920 B2
(45) Date of Patent: Apr. 1, 2025

(54) TECHNIQUES FOR DETECTING A TRACKING VEHICLE

(71) Applicant: TRATIX INTELLIGENCE LTD, Tel-Aviv (IL)

(72) Inventor: Sharon Rashty, Tel Aviv (IL)

(73) Assignee: TRATIX INTELLIGENCE LTD, Tel Aviv (IL)

( * ) Notice: Subject to any disclaimer, the term of this patent is extended or adjusted under 35 U.S.C. 154(b) by 88 days.

(21) Appl. No.: 17/587,642

(22) Filed: Jan. 28, 2022

(65) Prior Publication Data
US 2022/0381566 A1 Dec. 1, 2022

Related U.S. Application Data

(60) Provisional application No. 63/195,409, filed on Jun. 1, 2021.

(51) Int. Cl.
| | | |
|---|---|---|
| G01C 21/34 | (2006.01) | |
| G01S 19/48 | (2010.01) | |
| G06V 20/58 | (2022.01) | |

(52) U.S. Cl.
CPC ........ *G01C 21/3415* (2013.01); *G01S 19/485* (2020.05); *G06V 20/58* (2022.01)

(58) Field of Classification Search
CPC ... G01C 21/3415; G01S 19/485; G06F 18/23; G06V 20/58; G06V 10/56; G06V 20/625; G06V 2201/08; G06V 40/172
USPC .......................................................... 701/26
See application file for complete search history.

(56) References Cited

U.S. PATENT DOCUMENTS

| | | | |
|---|---|---|---|
| 2018/0272992 A1 | 9/2018 | Gage et al. | |
| 2019/0009785 A1* | 1/2019 | Lawrenson | G08G 1/017 |
| 2019/0051165 A1* | 2/2019 | Harer | G08G 1/22 |
| 2019/0096215 A1* | 3/2019 | Shahid | G08G 1/09626 |
| 2019/0188493 A1* | 6/2019 | Tiziani | G05D 1/0214 |
| 2019/0193729 A1* | 6/2019 | Fukuda | G08G 1/167 |
| 2019/0236379 A1* | 8/2019 | Golov | G06V 20/58 |
| 2019/0283747 A1* | 9/2019 | Okabe | B60W 30/10 |
| 2019/0316919 A1* | 10/2019 | Keshavamurthy | G08G 1/096844 |

(Continued)

FOREIGN PATENT DOCUMENTS

JP 2016151910 A * 8/2016

OTHER PUBLICATIONS

International Search Report and Written Opinion of International Searching Authority for PCT/IB2022/052857, ISA/IL, Jerusalem, Israel Dated: Jun. 12, 2022.

*Primary Examiner* — Mohamed Abdo Algehaim
(74) *Attorney, Agent, or Firm* — M&B IP Analysts, LLC

(57) ABSTRACT

A system and method for detecting tracking vehicles are provided. The method includes determining that a second vehicle is a tracking vehicle for a first vehicle by applying at least one tracking vehicle determination rule to data captured by the first vehicle with respect to the second vehicle, wherein each tracking vehicle determination rule defines a combination of parameters such that the second vehicle is determined to be the tracking vehicle when the data captured by the first vehicle includes the combination of parameters for at least one of the at least one tracking vehicle determination rule; generating a notification upon determination that the second vehicle is the tracking vehicle; and executing a resolution process based on determination that the second vehicle is the tracking vehicle.

17 Claims, 4 Drawing Sheets

(56) References Cited

U.S. PATENT DOCUMENTS

| | | | |
|---|---|---|---|
| 2019/0333167 A1* | 10/2019 | Valdhorn | H04N 7/18 |
| 2019/0354773 A1* | 11/2019 | Leizerovich | G06T 7/246 |
| 2019/0354774 A1* | 11/2019 | Leizerovich | G06T 7/246 |
| 2019/0354776 A1* | 11/2019 | Ribeiro | G08B 13/19695 |
| 2019/0356885 A1* | 11/2019 | Ribeiro | G06T 7/70 |
| 2020/0003569 A1* | 1/2020 | Polanowski | G01C 21/3697 |
| 2020/0111364 A1* | 4/2020 | Damsaz | G08G 1/0962 |
| 2020/0265694 A1 | 8/2020 | Xu et al. | |
| 2020/0387716 A1 | 12/2020 | Nadler | |
| 2021/0019645 A1* | 1/2021 | Petrey, Jr. | G06V 40/16 |
| 2021/0097295 A1* | 4/2021 | Sharma | G06V 20/52 |
| 2021/0097306 A1 | 4/2021 | Crary et al. | |
| 2021/0217308 A1* | 7/2021 | Tehrani | G08G 1/017 |
| 2022/0058400 A1* | 2/2022 | Bianconcini | G06T 7/20 |
| 2022/0369066 A1* | 11/2022 | Somanath | H04N 7/183 |
| 2023/0073717 A1* | 3/2023 | Child | G06F 16/909 |
| 2023/0316726 A1* | 10/2023 | Selinger | G06V 20/52 |
| | | | 382/159 |

\* cited by examiner

TECHNIQUES FOR DETECTING A TRACKING VEHICLE

CROSS-REFERENCE TO RELATED APPLICATIONS

This application claims the benefit of U.S. Provisional Application No. 63/195,409 filed on Jun. 1, 2021, the contents of which are hereby incorporated by reference.

TECHNICAL FIELD

The present disclosure generally relates to security systems and more specifically to a system and methods for detecting surveillance conducted by suspicious vehicles.

BACKGROUND

Automobiles nowadays experience continuous technological advancements with improvements in fields such as sensors, artificial intelligence, and computational techniques. These vehicles are equipped with many technological features such as lane assistance, speed tracking, blind-spot detection, GPS systems, and more, to facilitate driving and improve safety of a user (or driver).

Safety-related features are particularly of importance for the driver and passengers of the vehicle as well as their surroundings on the road. To this end, various sensors including cameras, for example, are provided to detect lanes, other vehicles, environmental structures, road type and the like, in real-time or near real-time in a predetermined vicinity to the operating vehicle.

One particular safety concern that requires attention relates to surveillance and separation from possible tracking vehicles. As an example, a vehicle that transports valuables can be a target of crime and be followed by a suspicious tracking vehicle. In this case, close and continuous monitoring of the surrounding environment and, more specifically of the following vehicles is desired. However, currently equipped technologies in automobiles are often limited to detection of immediate surroundings without the capability to monitor changes in the environment over time. Moreover, current technological features lack in enabling extensive data collection, and further, in determining patterns from collected data. Such limitations cause challenges for accurately detecting suspicious tracking vehicles for added safety measures to automobiles.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include method and system for detecting tracking vehicles. The method comprises: determining that a second vehicle is a tracking vehicle for a first vehicle by applying at least one tracking vehicle determination rule to data captured by the first vehicle with respect to the second vehicle, wherein each tracking vehicle determination rule defines a combination of parameters such that the second vehicle is determined to be the tracking vehicle when the data captured by the first vehicle includes the combination of parameters for at least one of the at least one tracking vehicle determination rule; generating a notification upon determination that the second vehicle is the tracking vehicle; and executing a resolution process based on determination that the second vehicle is the tracking vehicle.

Certain embodiments disclosed herein also include a non-transitory computer readable medium having stored thereon causing a processing circuitry to execute a process, the process comprising: determining that a second vehicle is a tracking vehicle for a first vehicle by applying at least one tracking vehicle determination rule to data captured by the first vehicle with respect to the second vehicle, wherein each tracking vehicle determination rule defines a combination of parameters such that the second vehicle is determined to be the tracking vehicle when the data captured by the first vehicle includes the combination of parameters for at least one of the at least one tracking vehicle determination rule; generating a notification upon determination that the second vehicle is the tracking vehicle; and executing a resolution process based on determination that the second vehicle is the tracking vehicle.

Certain embodiments disclosed herein also include a system for detecting tracking vehicles. The system comprises: a processing circuitry; and a memory, the memory containing instructions that, when executed by the processing circuitry, configure the system to: determine that a second vehicle is a tracking vehicle for a first vehicle by applying at least one tracking vehicle determination rule to data captured by the first vehicle with respect to the second vehicle, wherein each tracking vehicle determination rule defines a combination of parameters such that the second vehicle is determined to be the tracking vehicle when the data captured by the first vehicle includes the combination of parameters for at least one of the at least one tracking vehicle determination rule; generate a notification upon determination that the second vehicle is the tracking vehicle; and execute a resolution process based on determination that the second vehicle is the tracking vehicle.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
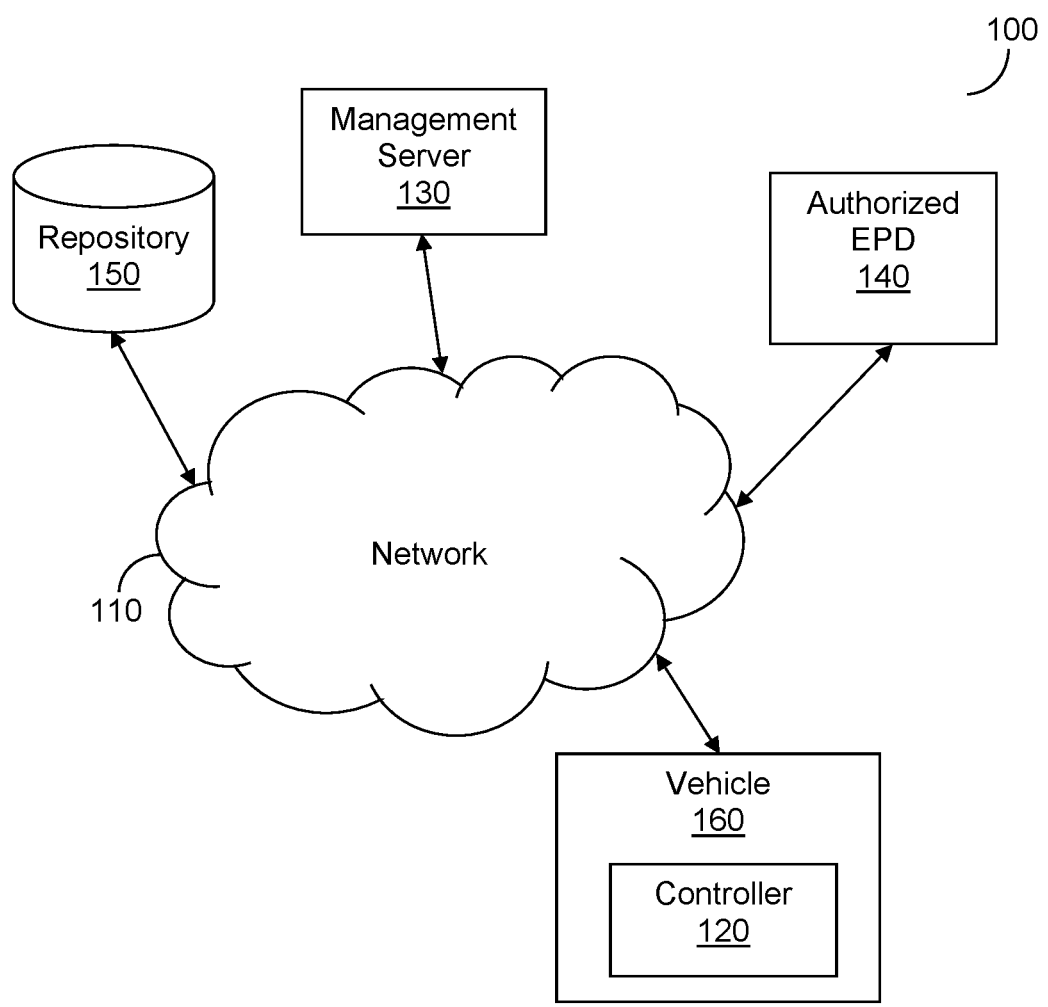
FIG. 1 is a network diagram utilized to describe the various embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments herein provide techniques for accurately detecting tracking vehicles. A dataset that includes an identifier of a second vehicle in a predetermined range from a first vehicle, coordinates of the first vehicle indicating a location in which the identifier was recorded, and a time pointer that is associated with each of the coordinates, is received by a management server. The dataset is analyzed by the management server based on at least one tracking vehicle determination rule for determining whether suspicious tracking vehicles are detected near the first vehicle. A notification is generated upon determining that a suspicious tracking vehicle is detected. Moreover, a resolution process to notify and possibly avoid the suspicious tracking vehicle may be executed.

The embodiments disclosed herein provide objective rules-based determination of the tracking vehicles based on data captured with respect to the second vehicle. By applying at least one tracking vehicle determination rule, a more consistent and accurate detection of tracking vehicles are enabled. As way of example, instead of relying on "feeling" or few instances when a driver may become aware of a certain second vehicle, which may be largely subjective, the tracking vehicle determination rule with defined combination of parameters allow thorough analysis of the captured data for objective detection and determination of the tracking vehicle. Moreover, the embodiments disclosed herein may provide additional information about the potential tracking vehicle in real-time, which can be otherwise unknown by, for example, a user or a security team, for effective detection of tracking vehicles.

FIG. 1 shows a network diagram utilized to describe the various embodiments. In the example network diagram 100, a management server 130, a controller 120 that is mounted to a first vehicle 160, are connected via a network 110. The network 110 may be, but is not limited to, a wireless, or cellular network, the Internet, the worldwide web (WWW), a local area network (LAN), similar networks, and any combination thereof.

The management server 130 may be configured to receive information, analyze information, send instructions, and the like, as further discussed herein. The controller 120 may include a hardware component, a software component and a combination thereof. The controller 120 may be mounted to or embedded within the first vehicle 160. The controller 120 may be connected to and control at least a camera and global navigation satellite system (GNSS) component (or any other position determination technique/system), as further described herein below. In an embodiment, the controller 120 may be configured to collect or otherwise receive information from the camera as well as from the GNSS component. The first vehicle 160 may be, as a non-limiting example, a car, a truck, an aerial vehicle, a vessel, a combination thereof, or the like. The components of the controller 120, as well as the components which communicate with the controller 120, are further discussed herein below with respect to FIG. 2.

At least one data repository 150 may be communicatively coupled with the management server 130 via the network 110, or embedded within the management server 130. The data repository 150 may be for example, a storage device containing thereon a database, a data warehouse, and so on. that may be used for storing data structures, data items, metadata, and so on. as further described herein. In some embodiments, one or more repositories may be distributed over several physical storage devices (for example in a cloud-based computing environment). Any storage device may be a network accessible storage device, or a component of the management server 130. The server 130 may be deployed in a cloud environment or on-premises.

According to an optional embodiment, an authorized endpoint device 140 may be further connected to the network 110. The authorized endpoint device 140 may be a computer, a laptop, a server, or the like. It should be noted that multiple authorized endpoint devices may be connected to the network 110 without departing from the scope of the disclosure.

Figure 2:
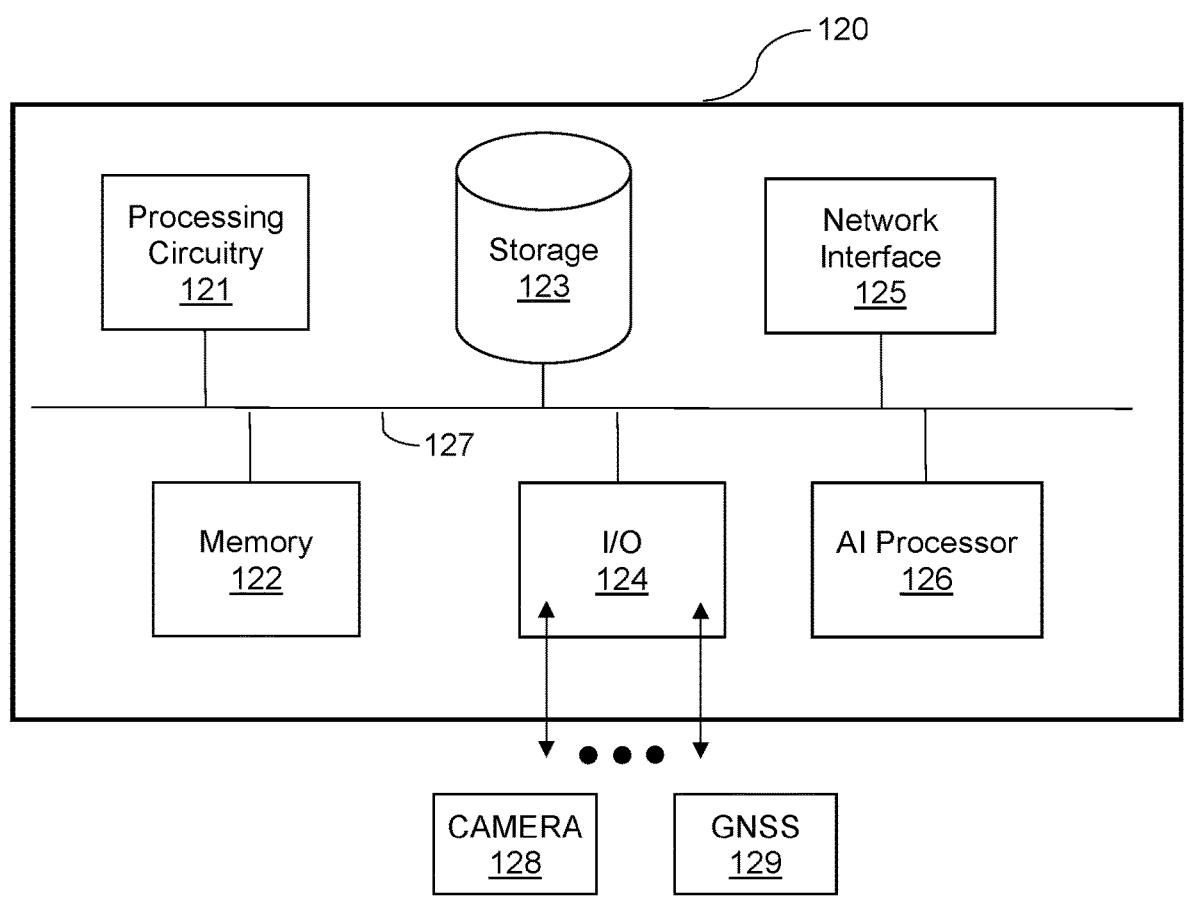
FIG. 2 shows a schematic block diagram of a controller utilized for detecting a tracking vehicle according to an embodiment.

FIG. 2 shows a schematic block diagram of a controller 120 according to an embodiment. The controller 120 includes a processing circuitry 121 that is configured to receive information, analyze information, generate outputs, and the like as further described herein. The processing circuitry 121 may be realized as one or more hardware logic components and circuits. As a non-limiting example, illustrative types of hardware logic components that can be used include field programmable gate arrays (FPGAs), application-specific integrated circuits (ASICs), application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The controller 120 further includes a memory 122. The memory 122 may contain therein instructions that, when executed by the processing circuitry 121, cause the controller 120 to execute actions as further described herein. The memory 122 may further store therein information such as, video content, textual representation of features extracted from video content, coordinates, time pointers associated with the coordinates, and the like.

The controller 120 may further include an input/output (I/O) interface 124 configured to communicate with and control one or more sensors such as a camera 128, a GNSS component 129, and the like. The camera 128 may be, as a non-limiting example, a digital camera designed to capture video content. Such video content may include elements located in a predetermined range from the vehicle to which the camera 128 is connected.

The elements may be for example vehicles, people, a combination thereof, or the like. Each element (e.g., vehicle) may include several features which may be detected and extracted as further described herein. A feature may be for example a license plate (e.g., license plate number), vehicle shape, height, color, or the like. In case the detected element is a person, the features may include for example, the person's face (that may be detected using face recognition techniques), hair color, height, or the like. It should be noted that a plurality of cameras (such as the camera 128) may be connected to the I/O interface 124 without departing from the scope of the disclosure. One or more cameras (e.g., the camera 128) may be mounted to the rear end of a vehicle (e.g., the vehicle 160, FIG. 1), the sides of the vehicle, the vehicle roof, front end, or the like. In further embodiment, the I/O interface 124 may be configured to communicate with an input/output device (not shown) including, but not limited to, a display screen, speaker, and the like. The display screen may be utilized to present, for example, electronic notifications, navigation route, and so on, to a user of the vehicle 160.

The GNSS component 129 may be implemented, as an example, a global positioning system (GPS) receiver, that is configured to calculate position (e.g., coordinates) of the receiver and time based on data received from multiple satellites.

In an embodiment, the controller 120 includes a network interface 125 that is configured to connect to a network. The network interface 125 may include, but is not limited to a wireless port (e.g., an 802.11 compliant Wi-Fi circuitry) configured to connect to a network (e.g., the network 110, FIG. 1).

According to an optional embodiment, the controller 120 includes an artificial intelligence (AI) processor 126. The AI processor 126 may be realized as one or more hardware logic components and circuits, including graphics processing units (GPUs), tensor processing units (TPUs), neural processing units, vision processing unit (VPU), reconfigurable field-programmable gate arrays (FPGA), and the like. The AI processor 126 is configured to perform, for example, machine learning based on, for example, sensory inputs, as further described herein. In one embodiment, the functions of the AI processor 126 may be performed, in full or in part, by the processing circuitry 121 by execution of a plurality of instructions stored in the memory 122.

The components of the controller 120 may be communicatively connected to at least the controller 120. According to a further embodiment, the components of the controller 120 are connected via a bus 127.

The controller 120 may be further coupled with a storage 123. The storage 123 may be used for the purpose of storing, as a non-limiting example, video content, textual representation of features extracted from video content, coordinates, time pointers associated with the coordinates, or the like.

Figure 3:
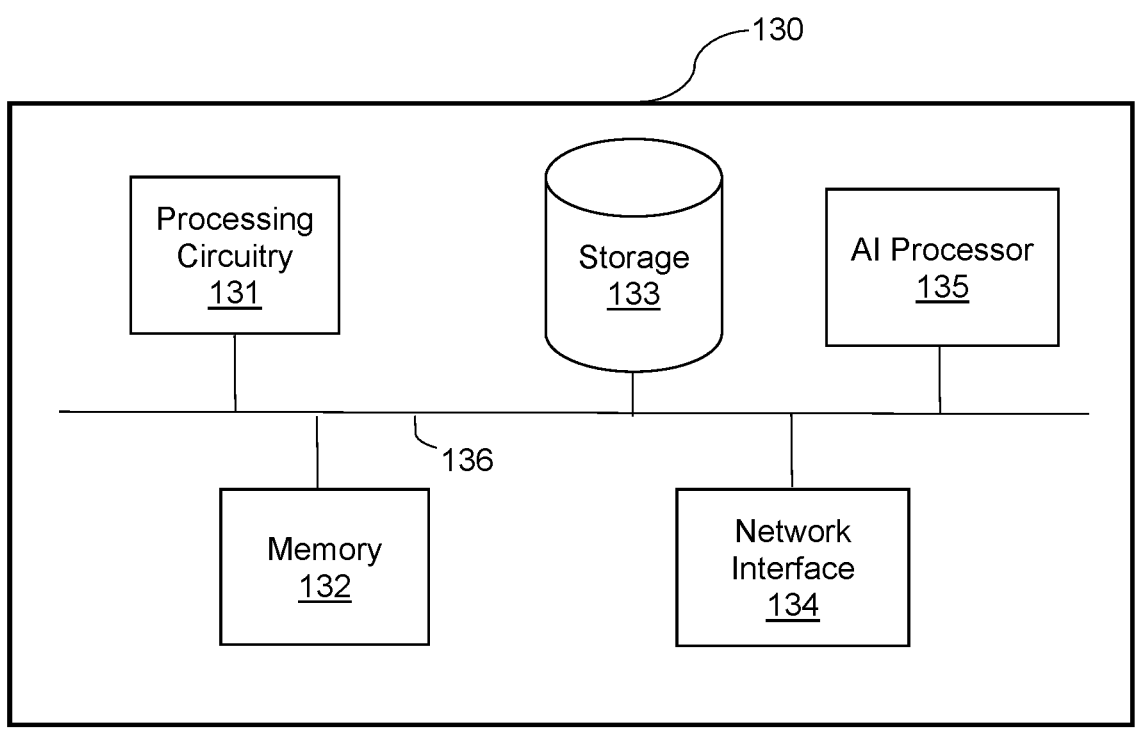
FIG. 3 shows a schematic block diagram of a management server utilized for detecting a tracking vehicle according to an embodiment.

FIG. 3 shows a schematic block diagram of a management server 130, according to an embodiment. The management server 130 includes a processing circuitry 131 that is configured to receive information, analyze information, generate outputs, send raw and/or processed information to other electronic devices, and the like, as further described herein. The processing circuitry 131 may be realized as one or more hardware logic components and circuits. As a non-limiting example, illustrative types of hardware logic components that can be used include field programmable gate arrays (FPGAs), application-specific integrated circuits (ASICs), application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The management server 130 further includes a memory 132. The memory 132 may contain therein instructions that, when executed by the processing circuitry 131, cause the management server 130 to execute actions as further described herein. The memory 132 may further store therein information such as, video content, textual representation of features extracted from video content, coordinates, time pointers associated with the coordinates, or the like.

In an embodiment, the management server 130 includes a network interface 134 that is configured to connect to a network. The network interface 134 may include, but is not limited to a wireless port (e.g., an 802.11 compliant Wi-Fi circuitry) configured to connect to a network (e.g., the network 110, FIG. 1).

The management server 130 may be further coupled with a storage 133. The storage 133 may be used for the purpose of, e.g., storing video contents, textual representation of features extracted from video content, coordinates, time pointers associated with the coordinates, or the like.

According to an optional embodiment, the management server 130 includes an artificial intelligence (AI) processor 135. The AI processor 135 may be realized as one or more hardware logic components and circuits, including graphics processing units (GPUs), tensor processing units (TPUs), neural processing units, vision processing unit (VPU), reconfigurable field-programmable gate arrays (FPGA), and the like. The AI processor 135 is configured to perform, for example, machine learning based on, for example, sensory inputs, as further described herein. In one embodiment the functions of the AI processor 135 may be performed, in full or in part, by the processing circuitry 131 by execution of a plurality of instructions stored in the memory 132.

The components of the management server 130 may be communicatively connected to at least the management server 130. According to a further embodiment, the components of the management server 130 are connected via a bus 136.

In an embodiment, the management server 130 receives from a controller (e.g., the controller 120, FIG. 2) that is mounted to a first vehicle, a dataset including a set of coordinates of the first vehicle, a time pointer that is associated with each of the set of coordinates and at least one identifier of at least a second vehicle in a predetermined range from the first vehicle. It should be noted that the first vehicle may be intermittently traveling.

As noted above, the controller 120 (e.g., the controller 120, FIG. 2) is connected to a video camera (e.g., the camera 128, FIG. 2) that is configured to capture video content of the environment in a predetermined distance from the first vehicle. The video content may include other vehicles that use the road, whether the other vehicles are located close (e.g., 15 feet) to the first vehicle and whether the other vehicles are located farther away (e.g., 90 feet) from the first vehicle. The controller 120 may be configured to apply, for example, computer vision techniques using an AI processor (e.g., the AI processor 126, FIG. 2) to the captured video content thereby allowing the extraction of features related to the elements shown in the video content.

As noted above, at least a second vehicle may be referred to as an element shown in the video content (e.g., in at least one image of the video content). A feature may be for example a license plate (e.g., license plate number), vehicle shape, height, color, or the like. Thus, for example, a license plate number (may include characters and symbols as well) of a second vehicle that drives behind the first vehicle is captured using the camera 128 and extracted using the AI processor 126.

In an embodiment, the extraction may include identifying a region of interest (ROI) within at least one image of the video content. Each ROI may include a feature which may be classified by the type of the feature (i.e., field name) and the content (i.e., value) related thereto. Then, the controller 120 may be configured to generate a structured textual data and store the structured textual data in a computer file, as a non-limiting example, a JavaScript object notation (JSON)

file. The structured textual data may include a license plate number (first feature) of a second vehicle, the color of the second vehicle (second feature), height (third feature), vehicle type (fourth feature), or the like. Each feature may be indicated as a field name in the computer file having a corresponding value. For example, in case only the license plate number has been detected by the controller 120, the textual data that may be generated and fed into the computer file is: {license plate: "123-ABC"}. The words "license plate" represent the field and the combination of digits and characters "123-ABC" represents the value.

As noted above, the controller 120 (e.g., the controller 120, FIG. 2) is connected to a GNSS component (e.g., the GNSS component 129, FIG. 2). The GNSS component 129 may be implemented, as a non-limiting example, a global positioning system (GPS) receiver. Such GPS receiver may be configured to calculate coordinates of the current location of the first vehicle 160 to which the GPS receiver is connected, and the time at which each set of coordinates was recorded. According to an embodiment, the controller 120 may be configured to extract sets of coordinates indicating the location of the first vehicle based on each frame (of the video content) that was recorded.

The extraction allows the controller 120 to determine (a) the route of the first vehicle, and (b) the exact location(s) of at least a second vehicle (e.g., based on detecting frames in which at least one identifier/feature of the second vehicle was detected). As an example, a second vehicle is detected behind the first vehicle by identifying the second vehicle's license plate number. According to the same example, when the second vehicle's license plate number is detected, the controller 120 extracts a set of coordinates indicating the location of the first vehicle where the license plate number was detected. According to the same example, a time pointer indicating the exact time at which the coordinates were recorded, is also extracted by the controller 120. In a further embodiment, the extracted data (i.e., coordinates and associated time pointer) may be stored in a memory (e.g., the memory 122).

As an example, a specific second vehicle license plate number is detected, and its value is extracted and recorded as: "456-DEF". According to the same example, a set of coordinates, indicating the location of the first vehicle at the time the license plate of the second vehicle was detected, is extracted using the controller 120 from the GNSS component 129 such that the following example set of coordinates is recorded: 40° 46'14.7"N 73° 58'57.4"W. The time pointer indicating when the set of coordinates was recorded indicates that the set of coordinates was recorded at 6:35:14 PM. The controller 120 then generates a structured dataset that includes the license plate number ("456-DEF"), the coordinates indicating the location where the first vehicle was located when the license plate was detected (40° 46'14.7"N 73° 58'57.4"W), and the time pointer associated with the coordinates (6:35:14 PM). As noted above, the dataset may be sent to the management server 130 over a network (e.g., the network 110, FIG. 1).

It should be noted that the dataset may include multiple clusters where each cluster includes a record indicating a feature(s) (e.g., license plate) of a certain element (e.g., second vehicle), the coordinates indicating the location where the feature was recorded, and the time pointer associated with the coordinates. In an embodiment, each cluster may include a record of a unique vehicle in a specific location at a specific time. The clusters showing the (a) location where at least a second (b) vehicle was detected and the (c) time at which the at least a second vehicle was detected, may be used by the management server 130 to detect or classify the at least a second vehicle as a suspicious tracking vehicle, as further described herein. For example, four clusters may be generated and indicate the same license plate along four different locations and time frames, within a city area and along a 10 kilometers route. A tracking vehicle (or a following vehicle) may be any kind of vehicle that drives in proximity to the first vehicle and is used for monitoring the route of the first vehicle, driving patterns, actions, or the like.

In an embodiment, the extracted coordinates and related time pointers may be used for determining roads names, streets names, etc. where the second vehicle has been detected along the route of the first vehicle. To this end, when the management server 130 receives the extracted coordinates, that are associated with a specific second vehicle (which is detected using at least one identifier), the management server 130 may be configured to generate a query and send the query (or, e.g., an API call) to a designated server, database, website, etc. that is adapted to process and convert the coordinates into street names, roads names, etc. and return the feedback to the management server 130. Thus, for example, a second vehicle may be detected (e.g., using the second vehicle license plate number) driving along 14 streets behind the first vehicle, taking 8 identical turns after the first vehicle.

In an embodiment, the management server 130 is configured to apply at least one tracking vehicle determination rule to the received dataset. The at least one rule (i.e., the tracking vehicle determination rule) may facilitate the determination of whether at least one of the at least a second vehicle is a suspicious tracking vehicle. Each rule may define a combination of parameters which includes several parameters considered in a specific manner that allow the management server 130 to determine whether a specific vehicle should be classified as a suspicious tracking vehicle. Such parameters may be, for example, time, location, location type (e.g., highway, street, and so on), distance (e.g., the distance the second vehicle tracks the first vehicle), second vehicle type, second vehicle license plate, patterns of behavior (e.g., number of turns made by the second vehicle after the first vehicle, number of times the second vehicle was identified in a predetermined period of time), or the like.

It should be noted that a rule may be used for detecting a pattern of one or more suspicious tracking vehicles that operate together to avoid being discovered. For example, in case two vehicles are intermittently detected as following the first vehicle along a 6 kilometer urban route, and when one vehicle is detected while the second is not, a suspicious tracking pattern may be detected and therefore the two vehicles may be both classified as suspicious tracking vehicles.

In further embodiment, a rule may determine that in case the same vehicle is detected in far-flung locations (e.g., locations that are remote from a current location, for example, as defined based on a threshold distance from GPS coordinates of the first vehicle), the vehicle may be classified as a suspicious tracking vehicle. To this end, the management server 130 may compare a license plate that has just been detected to a plurality of license plates of vehicles that were previously detected and stored in a database (e.g., the repository 150). It should be noted that the rules applied by the management server 130 may be designed for classifying certain vehicles as legitimate even though the vehicles are detected multiple times (e.g., neighbors, security, and so on).

As an example, a rule may determine that a second vehicle having a license plate number that is associated with a car rental company, and it is identified as intermittently driving after the first vehicle for 30 minutes on the highway, should not be classified as a suspicious tracking vehicle. However, a rule may determine that a second vehicle having a license plate number that is associated with a car rental company, and it is identified as intermittently driving after the first vehicle for 10 minutes along 20 streets and 6 identical turns, should be classified as a suspicious tracking vehicle.

In an embodiment, the license plate number of at least the second vehicle may be compared to a plurality of license plate numbers in order to determine whether the second vehicle is a suspicious tracking vehicle. The plurality of license plate numbers may be stored in a data repository (e.g., the repository 150). By searching the identified second vehicle's license plate through a plurality of license plates that are stored in a repository, information such as, vehicle's owner, vehicle type (rent, private, company, organization, etc.), or the like, may be detected. It should be noted that the license plate number may be considered among other parameters that may be used for determining whether a suspicious tracking vehicle is detected.

In an optional embodiment, the at least one rule may be used for determining a threat level of the at least a second vehicle. The threat level may be determined based on analysis of one or more of the abovementioned parameters. For example, using the license plate (e.g., comparison to license plates stored in a repository), driving patterns, vehicle type (e.g., bike, private vehicle, truck), or the like. As an example, upon determining that paparazzi is following the first vehicle (e.g., vehicle 125), the threat level may be determined, using at least one rule, to be relatively low. However, when the suspicious tracking vehicle is reported as a stolen vehicle (e.g., classified as stolen in the data repository), the threat level may be determined, using at least one rule, to be relatively high.

In an embodiment, the management server 130 is configured to generate an electronic notification upon determination that at least one suspicious tracking vehicle is detected. The electronic notification (e.g., e-mail, SMS, call, or the like) may include information about the suspicious tracking vehicle, such as, the license plate number, the vehicle type, color, tracking route in which the suspicious vehicle has been detected along the first vehicle route, or the like.

In an embodiment, the management server 130 is configured to execute a resolution process. The resolution process may be executed upon determining at least one suspicious tracking vehicle following the first vehicle. In an embodiment, the resolution process may include sending an alert and/or notification. The alert and/or electronic notification may be sent through a network (e.g., the network 110, FIG. 1) to an authorized endpoint device EPD (e.g., the authorized EPD 140). The EPD 140 may be associated with an operating entity, such as a security company, human operator, or the like. In a further embodiment, the alert and/or electronic notification are sent back to the controller 120 of the vehicle 160 (i.e., the first vehicle), and the controller 120 may be configured to communicate the electronic notification to an integral computerized controlling unit (not shown) of the vehicle 160, so that the electronic notification is presented through an input/output device (not shown), for example, displayed on the vehicle's screen.

In another embodiment, the resolution process may include changing the navigation route. The navigation route for the driver of the vehicle 160 may be determined upon detection of a suspicious vehicle by the management server 130. The navigation route may be processed to generate navigation instructions that can guide the vehicle to lose the suspicious tracking vehicle. In yet another embodiment, the resolution process may include changing a destination, for example, to a safe location, and a respective navigation route may be determined. In an embodiment, the navigation route including instructions may be provided to the vehicle 160, for example, through an input/output (I/O device) on the vehicle 160.

As an example, upon detecting and determining a suspicious tracking vehicle, a navigation route to the nearest police station may be determined. According to the same example, a plurality of navigation instructions based on the navigation route may be generated and provided to the vehicle, in order to present to the driver of the vehicle by, for example, displaying on a screen in the vehicle, announcing through a speaker, and the like. In an example embodiment, the determined navigation route may be used to automatically reset the final destination of the vehicle 160. In another embodiment, the navigation route including the generated plurality of navigation instructions may cause an autonomous vehicle to operate in compliance with the navigation instructions to separate from the suspicious tracking vehicle and/or drive towards a new, safe destination.

In another embodiment, the management server 130 may be configured to receive a video content (e.g., video stream) from the controller 120 and apply, for example, computer vision techniques using an AI processor (e.g., the AI processor 135, FIG. 3) to the captured video content thereby allowing to extract features, detect tracking patterns (e.g., behavioral patterns of second vehicle), or the like. As noted above, at least a second vehicle may be referred to as an element shown in the video content (e.g., in at least one image of the video content). A feature may be for example a license plate (e.g., license plate number), vehicle shape, height, color, or the like.

A pattern may include, for example, repetitiveness (e.g., identifying the same second vehicle along a great distance and multiple identical turns), way of driving, distance between vehicles, speed, a combination thereof, or the like. The AI processor 135 may be adapted to apply one or more machine learning models (supervised or unsupervised models) to the video content and thereby facilitate the determination of whether a pattern indicating at least one suspicious tracking vehicle is detected.

As noted above, the received video feed may be enriched with coordinates in which each element was detected and time pointers at which each set of coordinates was recorded. The model that is applied by the AI processor 135 may be utilized to perform frame by frame analysis of the video content. Thus, suspicious patterns may be detected and allow classification of one or more vehicles as suspicious tracking vehicles.

According to a further embodiment, the controller 120 may be configured to receive the video content (e.g., video stream) from the camera 128 and apply, for example, computer vision techniques using an AI processor (e.g., the AI processor 126, FIG. 2) to the captured video content thereby allowing to extract features, detect tracking patterns, or the like. The second vehicle may be referred to as an element shown in the video content (e.g., in at least one image of the video content). A feature may be for example a license plate (e.g., license plate number), vehicle shape, height, color, or the like. A pattern may include, for example, repetitiveness (e.g., identifying the same second vehicle along a great distance and multiple identical turns), way of driving, distance between vehicles, speed, a combination thereof, or the like. The AI processor 126 may be adapted to apply one or more machine learning models (supervised or unsupervised models) to the video content and thereby facilitates determination of whether a pattern indicating at least one suspicious tracking vehicle, is detected. As noted above, the received video feed may be enriched with coordinates in which each element was detected and time pointers at which each set of coordinates was recorded. The model that is applied by the AI processor 126 may be utilized to perform frame by frame analysis of the video content. Thus, suspicious patterns may be detected and allow classification of one or more vehicles as suspicious tracking vehicles.

Figure 4:
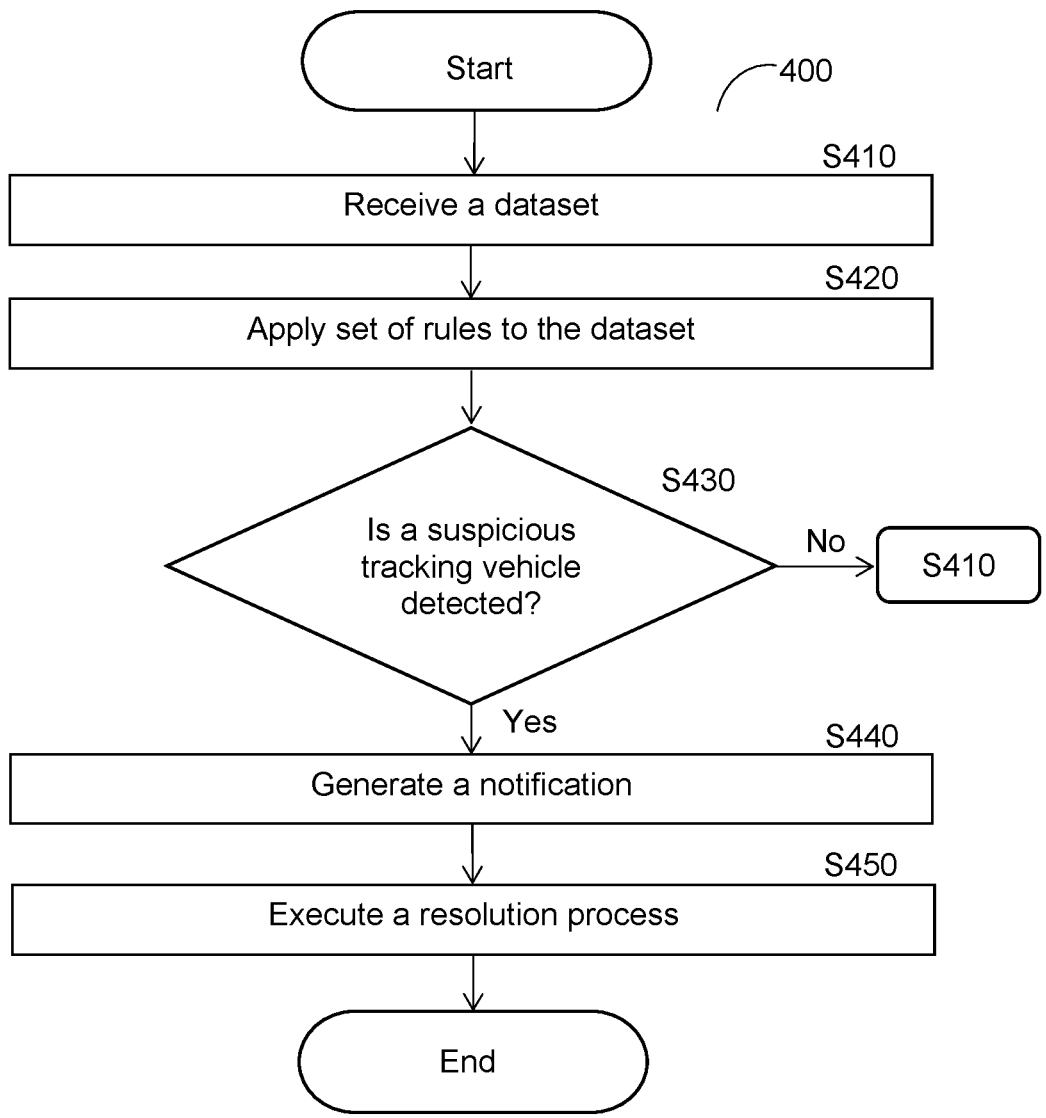
FIG. 4 is a flowchart of a method for detecting a tracking vehicle according to an embodiment.

FIG. 4 is an example flowchart 400 illustrating a method for detecting a tracking vehicle, according to an embodiment. The method described herein may be executed by the management server 130 that is further described herein above with respect to FIG. 3.

At S410, a dataset is received. The dataset may include at least one identifier of at least a second vehicle in a predetermined range from a first vehicle, a set of coordinates of the first vehicle indicating a location at which the at least one identifier was recorded, and a time pointer that is associated with each of the set of coordinates. As further discussed herein, the dataset may be captured and/or collected in real-time or near real-time by a controller (e.g., the controller 120, FIGS. 1 and 2) that is connected to a camera (e.g., the camera 128, FIG. 2) and a GNSS component (e.g., the GNSS component 129, FIG. 2). The controller 120 is mounted to the first vehicle and thereby facilitates capturing and recording real-time data, such as but not limited to, video content, coordinates of the first vehicle, and time pointers related to the coordinates.

At S420, at least one tracking vehicle determination rule is applied to the received dataset. As noted above, the at least one rule may facilitate determination of whether at least one of the at least a second vehicle is a suspicious tracking vehicle. A rule may define a combination of parameters in which several parameters may be organized or combined in a specific manner for determining the second vehicle as a suspicious tracking vehicle. Such parameters may be for example, time, location, location type (e.g., highway, street, etc.), distance (e.g., the distance the second vehicle tracks the first vehicle), second vehicle type, second vehicle license plate, number of turns made by the second vehicle after the first vehicle, number of times the second vehicle was identified in a predetermined period of time, or the like. In an embodiment, the combination of parameters may include at least one pattern of behavior of the second vehicle.

At S430, it is checked whether a suspicious tracking vehicle was detected. If so, execution continues with S440; otherwise, execution continues with S410.

At S440, a notification is generated. The notification may include information about the determined suspicious tracking vehicle such as, but not limited to, the license plate number, the vehicle type, color, tracking route in which the suspicious vehicle has been detected along the first vehicle route, or the like.

At S450, a resolution process is executed. The resolution process may include sending an alert, the generated notification or both, to an authorized endpoint device (e.g., the authorized EPD 140, FIG. 1). In an embodiment, the alert and/or generated notification may be sent to the controller (e.g., the controller 120) of the first vehicle.

In another embodiment, the resolution process may include generating a navigation route to avoid the second vehicle determined as the suspicious tracking vehicle. In a further embodiment, the resolution process may include changing a destination. As an example, the generated navigation route may include directions to a police station, a busy road, and the like. In an embodiment, the navigation route may be implemented to generate one or more navigation instructions and provide to the first vehicle. In an embodiment, the navigation instructions may be presented to a user (e.g., driver of the first vehicle) through an input/output (I/O) device of the first vehicle. In an example embodiment, the navigation instructions may be utilized to cause the first vehicle to navigate in compliance when the first vehicle is equipped with autonomous navigation capabilities.

In one embodiment, method described herein above with respect to FIG. 4 may be performed via the controller 120 (FIG. 1) without using the management server 130 (FIG. 1). That is, the dataset (e.g., video, coordinates, time pointers, and the like) may be collected and analyzed by the controller 120 without using a management server (e.g., the management server 130, FIG. 1). In another embodiment, although the analysis of the dataset and the determination of whether a suspicious tracking vehicle is detected, is performed by the controller 120, upon determination that a suspicious tracking vehicle is detected, the controller 120 may generate and send an electronic notification to, e.g., an authorized endpoint device (e.g., the authorized EPD 140, FIG. 1), a server (e.g., management server 130, FIG. 1), or the like.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method, implemented by computing equipment associated with a first vehicle that is at least partially self-driving, for detecting at least one vehicle tracking the first vehicle, comprising:
   determining that a second vehicle is a tracking vehicle for the first vehicle by applying at least one tracking vehicle determination rule to data captured by the first vehicle with respect to the second vehicle, wherein each tracking vehicle determination rule defines a combination of parameters such that the second vehicle is determined to be the tracking vehicle when the data captured by the first vehicle includes the combination of parameters for at least one of the at least one tracking vehicle determination rule, wherein the combination of parameters includes at least one pattern of behavior of the second vehicle, and wherein the determining is based on consideration of a route that has been taken by the first vehicle over a time period;
   wherein the determining determines that the second vehicle is the tracking vehicle for the first vehicle as a result of detecting a combined pattern of behavior of the second vehicle and a third vehicle whereas but for the combined pattern of behavior neither the second vehicle nor the third vehicle would be determined to be the tracking vehicle;
   when it is determined that the second vehicle is the tracking vehicle for the first vehicle:
   devising a new navigation route to a new destination, wherein the new navigation route comprises a plurality of navigation instructions based on the new destination; and
   implementing the new navigation route, wherein implementing the new navigation route comprises causing the first vehicle to navigate according to the plurality of navigation instructions.

2. The method of claim 1, further comprising sending an alert to at least one endpoint device that the second vehicle is the tracking vehicle.

3. The method of claim 1, wherein the new navigation route
   avoids the second vehicle that has been determined to be the tracking vehicle for the first vehicle.

4. The method of claim 1, further comprising:
   causing the plurality of navigation instructions to be projected to a user of the first vehicle via at least one input/output device of the first vehicle.

5. The method of claim 1, wherein the combined pattern of behavior includes the second vehicle and the third vehicle intermittently being detected to be following the first vehicle.

6. The method of claim 5, wherein the at least one combined pattern of behavior is identified over the time period.

7. The method of claim 6, further comprising:
   applying at least one machine learning model to at least a portion of the data captured by the first vehicle with respect to the second vehicle in order to identify the at least one pattern of behavior of the second vehicle, wherein the second vehicle is determined to be the tracking vehicle for the first vehicle based further on the identified at least one pattern of behavior of the second vehicle.

8. The method of claim 7, wherein the data captured by the first vehicle with respect to the second vehicle includes a video feed showing a plurality of elements, further comprising:
   enriching the video feed with a set of coordinates at which each of the plurality of elements was detected and a time pointer at which each set of coordinates was recorded, wherein the second vehicle is determined to be the tracking vehicle for the first vehicle based further on the enriched video feed.

9. A non-transitory computer readable medium having stored thereon instructions for causing a processing circuitry associated with a first vehicle that is at least partially self-driving to execute a process for detecting at least one vehicle tracking the first vehicle, the process comprising:
   determining that a second vehicle is a tracking vehicle for the first vehicle by applying at least one tracking vehicle determination rule to data captured by the first vehicle with respect to the second vehicle, wherein each tracking vehicle determination rule defines a combination of parameters such that the second vehicle is determined to be the tracking vehicle when the data captured by the first vehicle includes the combination of parameters for at least one of the at least one tracking vehicle determination rule, wherein the combination of parameters includes at least one pattern of behavior of the second vehicle, and wherein the determining is based on consideration of a route that has been taken by the first vehicle over a time period;
   wherein the determining determines that the second vehicle is the tracking vehicle for the first vehicle as a result of detecting a combined pattern of behavior of the second vehicle and a third vehicle whereas but for the combined pattern of behavior neither the second vehicle nor the third vehicle would be determined to be the tracking vehicle;
   when it is determined that the second vehicle is the tracking vehicle for the first vehicle:
   devising a new navigation route to a new destination, wherein the new navigation route comprises a plurality of navigation instructions based on the new destination; and
   implementing the new navigation route, wherein implementing the new navigation route comprises causing the first vehicle to navigate according to the plurality of navigation instructions.

10. A system for detecting at least one vehicle tracking a first vehicle, comprising:
    a processing circuitry; and
    a memory, the memory containing instructions that, when executed by the processing circuitry, configure the system to: determine that a second vehicle is a tracking vehicle for the first vehicle by applying at least one tracking vehicle determination rule to data captured by the first vehicle with respect to the second vehicle, wherein each tracking vehicle determination rule defines a combination of parameters such that the second vehicle is determined to be the tracking vehicle when the data captured by the first vehicle includes the combination of parameters for at least one of the at least one tracking vehicle determination rule, wherein the combination of parameters includes at least one pattern of behavior of the second vehicle, and wherein the determining is based on consideration of a route that has been taken by the first vehicle over a time period;

wherein to determine that the second vehicle is the tracking vehicle for the first vehicle the system is further configured to:

determine that the second vehicle is the tracking vehicle for the first vehicle as a result of detecting a combined pattern of behavior of the second vehicle and a third vehicle whereas but for the combined pattern of behavior neither the second vehicle nor the third vehicle would be determined to be the tracking vehicle;

when it is determined that the second vehicle is the tracking vehicle for the first vehicle:

devise a new navigation route, wherein the new navigation route comprises a plurality of navigation instructions based on the new destination; and implement the new navigation route to a new destination, wherein implementing the new navigation route comprises causing the first vehicle to navigate according to the plurality of navigation instructions.

11. The system of claim 10, wherein the system is further configured to send an alert to at least one endpoint device that the second vehicle is the tracking vehicle.

12. The system of claim 10, wherein the new navigation route avoids the second vehicle that has been determined to be the tracking vehicle for the first vehicle.

13. The system of claim 12, wherein the system is further configured to:

cause the plurality of navigation instructions to be projected to a user of the first vehicle via at least one input/output device of the first vehicle.

14. The method of claim 10, wherein the combined pattern of behavior includes the second vehicle and the third vehicle intermittently being detected to be following the first vehicle.

15. The system of claim 14, wherein the at least one combined pattern of behavior is identified over the time period.

16. The system of claim 10, wherein the system is further configured to:

apply at least one machine learning model to at least a portion of the data captured by the first vehicle with respect to the second vehicle in order to identify the at least one pattern of behavior of the second vehicle, wherein the second vehicle is determined to be the tracking vehicle for the first vehicle based further on the identified at least one pattern of behavior of the second vehicle.

17. The system of claim 16, wherein the data captured by the first vehicle with respect to the second vehicle includes a video feed showing a plurality of elements, wherein the system is further configured to:

enrich the video feed with a set of coordinates at which each of the plurality of elements was detected and a time pointer at which each set of coordinates was recorded, wherein the second vehicle is determined to be the tracking vehicle for the first vehicle based further on the enriched video feed.

\* \* \* \* \*